(12) United States Patent
Hofmann

(10) Patent No.: US 9,303,452 B2
(45) Date of Patent: Apr. 5, 2016

(54) ARRANGEMENT FOR A ROLLER BLIND

(71) Applicant: Dr. Ing. h.c. F. Porsche Aktiengesellschaft, Stuttgart (DE)

(72) Inventor: Peter Hofmann, Neuhausen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/496,012

(22) Filed: Sep. 25, 2014

(65) Prior Publication Data

US 2015/0083349 A1    Mar. 26, 2015

(30) Foreign Application Priority Data

Sep. 26, 2013    (DE) .................. 10 2013 110 650

(51) Int. Cl.
*B60J 1/08* (2006.01)
*E06B 9/40* (2006.01)
*B60J 1/20* (2006.01)

(52) U.S. Cl.
CPC ............ *E06B 9/40* (2013.01); *B60J 1/2019* (2013.01); *B60J 1/2027* (2013.01); *B60J 1/2044* (2013.01); *B60J 1/2083* (2013.01); *E06B 2009/402* (2013.01)

(58) Field of Classification Search
USPC .................... 160/370.22, 280–288
IPC ............... B60J 1/2027,1/2044, 1/2083, 1/2086
See application file for complete search history.

(56) References Cited

U.S. PATENT DOCUMENTS

| | | | |
|---|---|---|---|
| 4,836,263 A * | 6/1989 | Ament ..................... | 160/68 |
| 5,033,527 A * | 7/1991 | Ouvrard et al. .......... | 160/310 |
| 6,427,751 B1 * | 8/2002 | Schlecht et al. ........ | 160/370.22 |
| 6,598,929 B2 * | 7/2003 | Schlecht et al. .......... | 296/97.4 |
| 6,848,493 B1 * | 2/2005 | Hansen et al. ............ | 160/370.22 |
| 6,910,518 B2 | 6/2005 | Zimmermann et al. | |
| 7,396,067 B2 * | 7/2008 | Thumm et al. ............ | 296/143 |
| 2005/0263257 A1 * | 12/2005 | Hansen et al. ........... | 160/370.22 |
| 2007/0000625 A1 * | 1/2007 | Buhl et al. ............... | 160/370.22 |

FOREIGN PATENT DOCUMENTS

| | | |
|---|---|---|
| DE | 29921859 | 8/2000 |
| DE | 102006046065 | 6/2008 |
| EP | 1872989 | 1/2008 |

* cited by examiner

*Primary Examiner* — David Purol
(74) *Attorney, Agent, or Firm* — Gerald E. Hespos; Michael J. Porco; Matthew T. Hespos

(57) ABSTRACT

An arrangement for retracting and extending a roller blind web has a shaft (8) rotatably mounted in a cassette (6). A first longitudinal edge (10) of the roller blind (4) is mounted on the shaft (8) and can wind around the shaft (8). An end strip (14) is movable relative to the cassette (6) and has a housing (20) to which the second longitudinal edge (12) of the web (4) is connected. First and second gearwheels (30) with different diameters are in the housing (20) of the end strip (14) and can rotate about a common shaft (34). First and second telescopic arms (22, 24) are in the housing (20) and have first and second racks (26, 28) that engage the first and second gearwheels (30, 32). Thus, the telescopic arms (22, 24) can move simultaneously relative to the housing (20) by different distances in opposite directions.

12 Claims, 2 Drawing Sheets

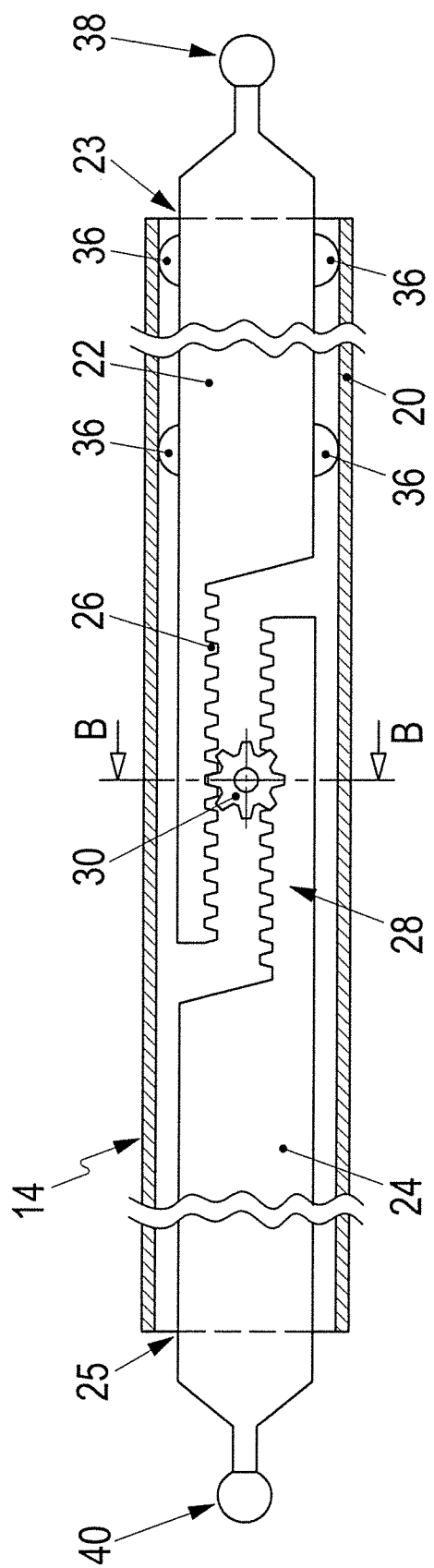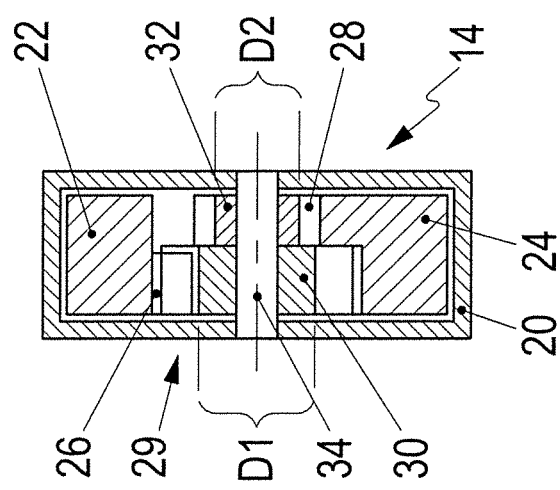
Fig. 2a
Fig. 2b

ARRANGEMENT FOR A ROLLER BLIND

CROSS REFERENCE TO RELATED APPLICATION

This application claims priority on German Patent Application No. 10 2013 110 650.1, filed Sep. 26, 2013, the entire disclosure of which is incorporated herein by reference.

BACKGROUND

1. Field of the Invention

The invention relates to an arrangement for retracting and extending a roller blind web.

2. Description of the Related Art

A roller blind or a roller shutter for a rectangular window is rectangular. One longitudinal edge of the roller blind is fastened to a shaft, and the roller blind can repeatedly be wound up on and unwound from the shaft. However, a side window of a motor vehicle may not be rectangular, and opposite longitudinal frames and/or opposite short frames of the window can be oriented at an angle to each other. To cover such a window, a roller blind has to be of substantially congruent design to the window, and therefore the roller blind has the shape of an irregular square. However, special measures must be taken to wind up a roller blind of this type.

U.S. Pat. No. 6,910,518 discloses a roller blind device for a window of a motor vehicle. This roller blind device comprises a first winding shaft that is mounted rotatably next to an edge of the window and one edge of a first roller blind web is fastened to the first winding shaft. The first roller blind web has a free edge that is movable away from the first winding shaft. This roller blind device also has at least one second winding shaft that is mounted rotatably next to another window edge and an associated second roller blind web has an edge fastened the second winding shaft. The second roller blind web has a free edge that is movable away from the second winding shaft. A drive device is mechanically operatively connected to all of the roller blind webs via sliding members so that the roller blind webs can be moved together, at least indirectly, in one direction. The output shaft of the drive device bears two transmission gearwheels with different active diameters. One transmission gearwheel is in engagement with the sliding member of the first roller blind web and the other transmission gearwheel is in engagement with the sliding member of the second roller blind web.

EP 1 872 989 B1 discloses a window roller blind for a vehicle window. This window roller blind comprises a roller blind shaft, a roller blind web that can be wound up on and unwound from the roller blind shaft, and a drive device that supplies the driving forces required for winding up and unwinding the roller blind web. A retraction force acts on the roller blind web when the roller blind web is wound up via the roller blind shaft, and an extension force acts on an extendable, rigid end of the roller blind web when the roller blind web is unwound. A gearwheel is arranged rotatably in each case at least at two points of the rigid end of the roller blind web. Each gearwheel engages in a rack that is mounted on the vehicle and extends in the direction of a movement of the roller blind web during the winding-up and unwinding operations. A first cable pulley is connected to the gearwheel for rotation therewith and a pull element is unwound from the pulley during the unwinding of the roller blind web.

DE 299 21 859 U1 discloses a window roller blind for a side window of a motor vehicle. This window roller blind comprises a roller blind web that is reversibly wound up on a winding shaft. The free end of a roller blind web is fastened to a pull bar that is guided at least at one of the end-side ends of said window roller blind. The pull bar is connected to a drive device for the extension and retraction of the roller blind web. The pull bar has at least one first compensating device for changing the axial length thereof.

DE 10 2006 046 065 A1 describes a window roller blind for a motor vehicle. The window roller blind has a rotatably mounted winding shaft with two ends. A roller blind web has one edge fastened to the winding shaft and an opposite edge fastened to a pull bar. Guide rails which run on both sides of the stretched roller blind web and guide the pull bar in an interlocking manner. The window roller blind has first and second sliding members assigned respectively to the first and second guide rails. The sliding members are guided by guide rails, and each has a toothing that interacts in a sliding manner with the pull bar. The window roller blind also has two drive gearwheels assigned respectively to the first and second sliding members. The sliding members are arranged at the ends of the winding shaft. A connecting shaft of the window roller blind is coupled to the two drive gearwheels for rotation therewith. The sliding members lie kinematically between the drive wheels and the pull bar. Furthermore, an electric drive motor of the window roller blind is coupled to the winding shaft and a spring motor of the window roller blind is coupled to the connecting shaft.

SUMMARY OF THE INVENTION

The invention relates to an arrangement for retracting and extending an at least square roller blind web of a roller blind. The roller blind web has a first longitudinal edge and a second longitudinal edge that is shorter than the first longitudinal edge. The longitudinal edges are opposite each other. The arrangement of the invention also comprises a cassette and an end strip. The cassette is designed to accommodate the roller blind web and has a shaft. The first longitudinal edge is arranged on the shaft, and the roller blind web can be wound up around the shaft. The second longitudinal edge is arranged on a housing of the end strip.

A first gearwheel with a first diameter $D1$ and a second gearwheel with a second diameter $D2$ are arranged in the housing of the end strip. The two gearwheels can rotate in the same direction of rotation about a common shaft.

First and second telescopic arms are assigned to the housing of the end strip. Each telescopic arm has a section arranged within the housing and has a rack.

A rack of the first telescopic arm can roll along the first gearwheel with the first diameter $D1$ and a rack of the second telescopic arm can roll along the second gearwheel with the second diameter $D2$. As a result, the first telescopic arm is moved relative to the housing by a first distance $S1$ in a first direction and the second telescopic arm is moved at the same time relative to the housing by a second distance $S2$ in an opposed, second direction.

The two longitudinal edges of the roller blind web may be oriented at an angle to each other. The longitudinal edges in this case are arranged obliquely with respect to each other. The two longitudinal edges can be parallel to each other.

The first diameter $D1$ of the first gearwheel may be greater than the second diameter $D2$ of the second gearwheel. In this case, the first distance $S1$ by which the first telescopic arm is moved is greater than the second distance $S2$ by which the second telescopic arm is moved.

The two gearwheels may be fastened to each other and therefore form a gearwheel module with the common shaft. The two gearwheels should always rotate in the same direction of rotation. The two gearwheels can rotate about the common shaft, with the shaft and therefore the two gearwheels moving in the clockwise or counterclockwise direction, depending on perspective. Thus, the two telescopic arms, the racks of which can roll on the gearwheels, are moved in opposite directions. The two telescopic arms can move away from each other so that each telescopic arm can move or slide out of the housing of the end strip. Alternatively, the telescopic arms can move toward each other and can therefore enter or slide into the housing from opposite directions.

A ratio of the diameters D1 and D2 of the two gearwheels to each other is defined by a factor $f=D1/D2$. In addition, a circumference of a gearwheel is proportional to the diameter thereof. The two gearwheels may rotate about the common shaft by any angle that may be greater than 360° so that the gearwheels execute more than one complete revolution. Thus, the two telescopic arms are moved by the distances S1 and S2 provided for them, with a ratio of the two distances S1 and S2 corresponding to the factor $f=S1/S2$.

The first diameter D1 of the first gearwheel may be greater by the factor $f>1$ than the second diameter D2 of the second gearwheel, and therefore $D1=f*D2$. In the event of a common, simultaneous rotation of the two gearwheels about the common shaft, it turns out that the first telescopic arm is moved by the first distance S1, which is greater by the same factor f than the second distance S2 by which the second telescopic arm is moved, wherein $S1=f*S2$. If the two gearwheels are identical in size and have the same diameters D1, D2, $f=1$. Consequently, the distances S1 and S2 are also the same size in this case.

The arrangement of the invention also may comprise first and second guide rails. The first guide rail may arranged on a first outer edge of the cassette and a second guide rail may be arranged on a second outer edge of the cassette. Each guide rail is arranged at an angle to a longitudinal axis of the cassette, and the longitudinal axis can be parallel to the shaft in the cassette. Each telescopic arm further has an end outside the housing and has a sliding element. A first sliding element at the end of the first telescopic arm can be displaced along the first guide rail and a second sliding element at the end of the second telescopic arm can be displaced along the second guide rail.

The guide rails can have different or identical lengths. Furthermore, the guide rails can be at an angle to each other or parallel to each other. In one embodiment, the first guide rail is shorter than the second guide rail. As a rule, the first telescopic arm, which can be moved by the longer distance S1, is oriented in the direction of the first, shorter guide rail, whereas the second telescopic arm, which can be moved by the shorter distance S2, is oriented in the direction of the second, longer guide rail.

The arrangement is provided for retracting and extending a roller blind web that can have the shape of an irregular square with longitudinal edges of different lengths and short edges of different lengths. The longitudinal edges and short edges can be arranged at an angle to each other. If the longitudinal edges of different lengths of the roller blind web are parallel, the roller blind web defines an isosceles trapezoid with each longitudinal edge oriented at the same angle to the adjacent short edge thereof. However, an irregular trapezoid with four different angles is possible. It is also possible for a longitudinal edge and the adjacent short edge thereof to be oriented at a right angle, and therefore at 90° to each other.

The two telescopic arms may be parallel to each other along a longitudinal axis of the end strip and of the housing. The ends of the two telescopic arms, on which the sliding elements are arranged, may face away from each other. Sections of the telescopic arms in the housing and on which the racks are arranged face each other.

The two telescopic arms can move in an opposed manner, with the movement being imparted via the two gearwheels of the gearwheel module rotating about the common shaft. Thus, the first sliding element can be guided in the first, shorter guide rail and covers the larger distance S1 in the direction of the longitudinal axis of the end strip. The second sliding element can be guided in the second, longer guide rail, and covers the distance S2 in the direction of the longitudinal axis of the end strip. In a refinement, the second distance S2 is shorter than the first distance S1. Accordingly, the telescopic arms can move parallel to the longitudinal axis of the end strip. A ratio of the two distances S1 and S2, along which the two telescopic arms move in an opposed manner relative to each other, corresponds to the factor f irrespective of whether the roller blind is to be opened or closed. The roller blind web can be unwound from the shaft and pulled out of the cassette to extend the roller blind so that the window can be shaded, with the telescopic arms sliding into the housing of the end strip in an oppositely directed manner. The roller blind web also can be wound up onto the shaft and drawn into the cassette to retract the roller blind and open the window, with the telescopic arms sliding out of the housing in an oppositely directed manner.

The cassette may be arranged on an upper or a lower long-side frame, of the window. The two guide rails can be arranged on opposite short-side frames of the window. Both the long-side frames and the short-side frames may be oriented at an angle to one another. The long-side frames or the short-side frames can be parallel to one another if the window is an isosceles or non-isosceles trapezoid,.

A motor may be connected via a first coupling module to the first guide rail and via a second coupling module to the second guide rail. The first sliding element can be driven along the first guide rail via the motor. The second sliding element can be driven and displaced along the second guide rail via the motor. The coupling modules may be connected to a flexible shaft of the motor, such as Bowden cables or flexible shafts.

The arrangement may be for a side window of a motor vehicle. A lower long frame of the side window customarily is longer than an upper long frame. The guide rails are arranged on lateral or short frames of the side window. The cassette may be arranged on the longer, lower long frame and the end strip can move between the shorter, upper frame and the longer, lower frame. The telescopic arms can move relative to the housing by the described distances S1 and S2, which may differ in length.

Further advantages and refinements of the invention emerge from the description and the attached drawings. The features mentioned above and those to be explained below can be used in the respectively stated combination, and also in different combinations or on their own, without departing from the scope of the invention.

BRIEF DESCRIPTION OF THE DRAWINGS

FIG. 2a is a schematic illustration of an end strip of the arrangement of FIG. 1, and FIG. 2b is a cross-section taken along line B-B of FIG. 2a.

DETAILED DESCRIPTION

Figure 1:
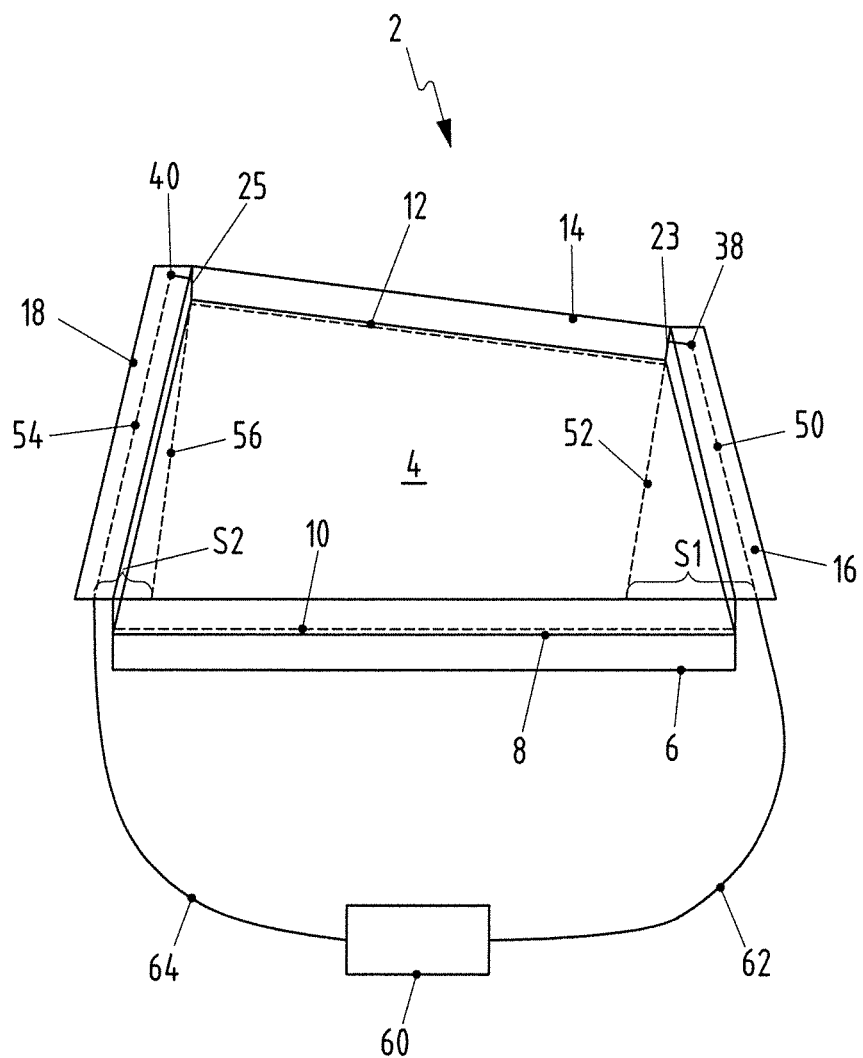
FIG. 1 is a schematic illustration of an embodiment of the arrangement of the invention.

An arrangement according to the invention is identified by the numeral 2 in FIG. 1. The arrangement 2 includes a roller blind web 4 for a side window of a motor vehicle. The window has the shape of an irregular square, as shown in FIG. 1. Accordingly, the roller blind web 4 of the arrangement 2, with which the window can be covered, also is of irregular square design. The arrangement 2 comprises a cassette 6 containing a shaft 8, to which a first longitudinal edge 10 (dashed line) of the roller blind web 4 is fastened. A second longitudinal edge 12 (dashed line) of the roller blind web 4 is opposite the first longitudinal edge 10 and is fastened to an end strip 14 of the arrangement 2. In addition, the arrangement 2 comprises a first guide rail 16 (on the right) and a second guide rail 18 (on the left). The first guide rail 16 is shorter than the second guide rail 18.

Details of the end strip 14 are shown in FIGS. 2a and 2b. More particularly, the end strip 14 has a housing 20 with opposite outer edges, as shown in FIG. 2a in a section along the housing 20 and in FIG. 2b in a section along the line B-B, which is perpendicular to the longitudinal axis of the end strip 14.

A first telescopic arm 22 (on the right) and a second telescopic arm 24 (on the left) are arranged in the housing 20 of the end strip 14. The telescopic arms 22 and 24 can be displaced inward and outward relative to the housing 20 through openings 23, 25 in the outer ends and therefore can be telescoped relative to the housing 20. Furthermore, a section of the first telescopic arm 22 in the housing 20 has a rack 26 and a section of the second telescopic arm 24 in the housing 20 likewise has a rack 28.

A gearwheel module 29 is arranged approximately at the center of the housing 20 and has a first, larger gearwheel 30 with a first diameter D1 and a second, smaller gearwheel 32 with a second diameter D2. The gearwheels 30, 32 can both rotate in the same direction of rotation about a common shaft 34 of the gearwheel module 29. The rack 26 of the first telescopic arm 22 can roll and mesh along a toothing of the first gearwheel 30, whereas the rack 28 of the second telescopic arm 24 can roll on and mesh with the second gearwheel 32.

The first telescopic arm 22 can move into and out of a first opening 23 on a first or right outer edge of the housing 20, while the second telescopic arm 24 can move into and out of the housing 20 from a second opening 25 on a second or left outer edge.

The diameter D1 of the first gearwheel 30 is larger by a factor f (f≥1) than the diameter D2 of the second gearwheel 32, and therefore $D1=f*D2$.

The two telescopic arms 22, 24 are mounted on an inner wall of the housing 20 via sliding blocks 36, which are illustrated here only on an outer wall of the second telescopic arm 24. Furthermore, a first sliding element 38 is arranged at an end of the first telescopic arm 22 that is arranged outside the housing 20 and a second sliding element 40 is arranged at an end of the second telescopic arm 24 that is arranged outside the housing 20. The ends of the telescopic arms 22, 24 with the sliding elements 38, 40 fastened thereto face away from each other. The first sliding element 38 at the outer end of the first telescopic arm 22 is arranged displaceably within the first guide rail 16, and the sliding module 40 of the second telescopic arm 24 is arranged displaceably within the second guide rail 18.

During operation of the arrangement 2, the roller blind web 4 is completely rolled-up and on the shaft 8 within the cassette 6 if the window is not covered or shaded by the roller blind web 4. On the other hand, the end strip 14 can be pulled up to at least partially or completely unwind or unroll the roller blind web 4 from the shaft 8 to close or shade the window.

To shade the window, the end strip 14 is moved up and away from the shaft 8 in the cassette 6 so that the extended telescopic arms 22, 24 enter into the housing 20. To open up the shaded window again, the end strip 14 is moved in the direction of the cassette 6, and the telescopic arms 22, 24 can move out of the housing 20.

The first sliding element 38 can be moved within the first guide rail 16 along a first dashed line 50 in FIG. 1. A path of a movement of the opening 23 on the right outer edge of the end strip 14 is indicated by a second dashed line 52. The first distance S1 can be covered here by the first sliding element 38 parallel to the longitudinal axis of the end strip 14.

For comparison, a third dashed line 54, along which the second sliding element 40 moves within the second guide rail 18, and a fourth dashed line 56, along which the opening 25 on the left outer edge of the end strip 14 moves, are indicated in FIG. 1. The second sliding element 40, and therefore the second telescopic arm 24, have to cover the distance S2 parallel to the longitudinal axis of the end strip 14.

In the embodiment described, the first distance S1 is greater by the factor f than the second distance S2, wherein $S1=f*S2$, and lengths of the two distances S1 and S2 relate to each other in the same manner as the diameters D1 and D2 of the two gearwheels 30, 32.

FIG. 2b shows the two interconnected gearwheels 30, 32 of the gearwheel module 29. The gearwheels 30, 32 have the different diameters D1, D2. Thus, the second gearwheel 32 is hidden behind the first gearwheel 30 in the detailed sectional illustration of FIG. 2a. In addition, a toothing of the first rack 26 of the first telescopic arm 22 has a greater spacing from the shaft 34 than a toothing of the rack 28 of the second telescopic arm 24. In this embodiment, the rack 28 of the second telescopic arm 24 is wider than the rack 26 of the first telescopic arm 22.

In the open state of the roller blind, the end strip 14 is rests on the cassette 6, and the two telescopic arms 22, 24 are pulled out of the housing 20. The first telescopic arm 22 (on the right) is pulled out of the housing 20 by the greater first distance S1 and the second telescopic arm 24 (on the left) by the shorter, second distance S2.

In a refinement of the arrangement 2, the first telescopic arm 22 can be pulled out by the first distance S1 that is greater by the factor f than the second distance S2 by which the second telescopic arm 24 is pulled out of the housing 20. To shade or close the window, the first sliding module 38 can be displaced up along the first guide rail 16, and the second sliding module 40 can be displaced up along the second guide rail 18. The second sliding module 40 at the end of the second telescopic arm 24 covers the second distance S2 in the direction of the longitudinal axis of the end strip 14. The distance S2 is shorter by the factor f than the first distance S1 covered by the first sliding module 38 at the end of the first telescopic arm 22 in the opposite direction along the longitudinal axis of the end strip 14. Conversely, however, the first sliding element 38 covers a shorter distance in the first shorter guide rail 16, along the dashed line 50, than the second sliding element 40 in the second longer guide rail 80, along the dashed line 54.

FIG. 1 shows a motor 60 with a flexible shaft that is connected via a first coupling module 62 to the first guide rail 16 and via a second coupling module 64 to the second guide rail 18. The first sliding element 38 can be moved by the motor 60 via the first coupling module 62 and the second sliding element 40 can be moved by the motor 60 via the second coupling module 64.

The end strip 14 can be pushed up to close or shade the window. Thus, the two gearwheels 30, 32 rotate counterclockwise about the common shaft 34, according to FIG. 2a, and the two telescopic arms 22, 24 move into the openings 23, 25 in the outer ends of the housing 20 to displace by the respective distances S1 and S2. The end strip 14 can be pushed down in the direction of the cassette 6 to open the window. Thus, the gearwheels 30, 32 rotate in the clockwise direction about the common shaft 34 and the telescopic arms 22, 24 move out of the housing 20 by the respective distances S1 and S2.

The embodiment of the arrangement 2 that is presented FIGS. 1, 2*a* and 2*b* is provided for a roller blind web 4 that has an area of an irregular square. An alternative embodiment can be provided for a roller blind web in the shape of a trapezoid, in which the longitudinal edges of the roller blind web are parallel to each other. Also in this case, gearwheels, along which racks of telescopic arms can roll, have a ratio that is defined by the factor f, of distances, by which the two telescopic arms can be displaced in opposite directions.

What is claimed is:

1. An arrangement for retracting and extending a roller blind web that has a first longitudinal edge and a second longitudinal edge that is shorter than and opposite to the first longitudinal edge, comprising:
   a cassette;
   a shaft rotatably mounted in the cassette, the first longitudinal edge of the roller blind being fixed on the shaft so that the roller blind web can be wound around and unwound from the shaft into and out of the cassette in a direction transverse to the shaft;
   an end strip movable relative to the cassette, the end strip including a housing and the second longitudinal edge of the roller blind being connected to the end strip;
   a first gearwheel with a first diameter and a second gearwheel with a second diameter being arranged in the housing of the end strip and being rotatable about a common shaft, the second diameter being smaller than the first diameter; and
   first and second telescopic arms arranged in the housing and being provided respectively with first and second racks that are engaged respectively with the first and second gearwheels so that the first telescopic arm can roll along the first gearwheel and move relative to the housing by a first distance in a first direction and so that the second telescopic arm can simultaneously roll along the second gearwheel and move relative to the housing by a second distance in a second direction opposite to the first direction, with the first distance being greater than the second distance by an amount that is a function of a difference between the first and second diameters.

2. The arrangement of claim 1, in which the longitudinal edges are oriented at an angle to each other.

3. The arrangement of claim 1, further comprising first and second guide rails, each telescopic arm having an end outside the housing, a first sliding element at the end of the first telescopic arm and being displaceable along the first guide rail and a second sliding element at the end of the second telescopic arm and being displaceable along the second guide rail.

4. The arrangement of claim 3, wherein the guide rails differ in length.

5. The arrangement of claim 3, wherein the guide rails are oriented at an angle to each other.

6. The arrangement of claim 4, wherein the arrangement is provided for a window that can be at least partially covered with the roller blind web.

7. The arrangement of claim 6, in which the cassette can be arranged on a long-side frame of the window.

8. The arrangement of claim 6, wherein the guide rails are arranged on short-side frames of the window.

9. The arrangement of claim 3, further comprising a motor connected via a first coupling module to the first guide rail and via a second coupling module to the second guide rail, the first and second sliding elements being displaceable along the first and second guide rails via the motor.

10. The arrangement of claim 9, wherein the coupling modules are connected to a flexible shaft of the motor.

11. The arrangement of claim 10, wherein the coupling modules are Bowden cables.

12. The arrangement of claim 1, wherein the arrangement is provided for a side window of a motor vehicle.

\* \* \* \* \*